(12) United States Patent
Escoto et al.

(10) Patent No.: US 7,236,677 B2
(45) Date of Patent: Jun. 26, 2007

(54) OPTICAL FIBER DISTRIBUTION APPARATUS

(75) Inventors: Alejandro Raigoza Escoto, Reynosa Tamaulipas (MX); Gerardo Teefilo Pavon Lara, Reynosa Tamaulipas (MX); Leocadio Meza Zaleta, Reynosa Tamaulipas (MX)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/997,280

(22) Filed: Nov. 24, 2004

(65) Prior Publication Data

US 2006/0110118 A1    May 25, 2006

(51) Int. Cl.
*G02B 6/00* (2006.01)
(52) U.S. Cl. ........................................ 385/135; 385/134
(58) Field of Classification Search ................. 385/135
See application file for complete search history.

(56) References Cited

U.S. PATENT DOCUMENTS

| 4,752,110 | A |   | 6/1988  | Blanchet et al. ......... 350/96.2 |
| 4,776,662 | A |   | 10/1988 | Valleix ................... 350/96.2 |
| 4,971,421 | A |   | 11/1990 | Ori ......................... 350/96.2 |
| 5,109,467 | A |   | 4/1992  | Hogan et al. ............. 385/135 |
| 5,204,929 | A |   | 4/1993  | Machall et al. ........... 385/135 |
| 5,402,515 | A | * | 3/1995  | Vidacovich et al. ....... 385/135 |
| 5,969,294 | A | * | 10/1999 | Eberle et al. .............. 174/57 |
| 6,201,920 | B1|   | 3/2001  | Noble et al. .............. 385/134 |
| 6,424,781 | B1|   | 7/2002  | Puetz et al. .............. 385/135 |
| 2004/0094491 | A1 | * | 5/2004 | Smith et al. ............. 211/26 |

\* cited by examiner

*Primary Examiner*—Brian Healy
*Assistant Examiner*—Mary El-Shammaa
(74) *Attorney, Agent, or Firm*—Keith A. Roberson (57) ABSTRACT

An optical fiber distribution apparatus is provided having a base panel and first and second mounting panels spaced apart mounted to the base panel. A sub-panel assembly is movably mounted between the first and second mounting panels, and may be tilted from a first position to a second position by simultaneously translating and rotating the sub-panel assembly. In one embodiment, the sub-panel assembly may be tilted from the first position to the second position by rotating the sub-panel assembly in either a clockwise or a counter-clockwise direction.

24 Claims, 6 Drawing Sheets

OPTICAL FIBER DISTRIBUTION APPARATUS

BACKGROUND OF THE INVENTION

1. Field of the Invention

The present invention relates to a telecommunications fiber optic interconnection apparatus, and more particularly to an optical fiber distribution apparatus having a movable sub-panel.

2. Technical Background

Optical fiber and fiber optic cables are increasingly being used for transmitting voice, data and video communications. In a typical installation, a provider cable will extend to an interconnection or distribution apparatus at a customer facility. The optical fiber distribution apparatus includes a housing that may be mounted to or in wall, a ceiling or a floor. The provider optical cable contains a bundle of individual optical fibers, each fiber transmitting optical signals. The provider cable passes through a provider port in the housing and the individual fibers, having connectors on the ends of the fibers, mount to adapters on a distribution sub-panel. The distribution sub-panel has a plurality of apertures, one for each connector pair/adapter. A customer optical cable leads from various work stations to the housing through a customer port and optically connects the customer optical fibers with the provider optical fibers at the distribution sub-panel.

Because the housing may be mounted in a number of difficult-to-reach locations or orientations, fiber optic components routed and mounted within the housing may be difficult for the installer to access.

SUMMARY OF THE INVENTION

In one broad aspect, an optical fiber distribution apparatus is disclosed including a base panel and first and second mounting panels. The first and second mounting panels are mounted orthogonal to the base panel. The apparatus further includes at least one sub-panel assembly for mounting a plurality of fiber optic components, with the sub-panel assembly being movably mounted to the mounting panels. The sub-panel assembly may be moved from a first position to a second position by rotating and translating the sub-panel. Preferably, the sub-panel may be tilted from the first position to the second position by simultaneously rotating and translating the sub-panel assembly. In one embodiment, the sub-panel assembly may be rotated in either a clockwise or a counter-clockwise direction.

In another broad aspect of the invention, an optical fiber distribution apparatus is disclosed comprising a base panel and first and second mounting panels wherein the first mounting panel is in an opposing relationship with the second mounting panel. At least one sub-panel assembly for mounting a plurality of fiber optic components is movably mounted between the first and second mounting panels. The sub-panel assembly may be moved from a first position to a second position by simultaneously rotating and translating the sub-panel.

In still another broad aspect of the invention, an optical fiber distribution apparatus is provided comprising a first mounting panel, a second mounting panel disposed in an opposing and substantially parallel relationship with the first mounting panel and at least one sub-panel assembly for mounting a plurality of fiber optic components. The sub-panel assembly is movably mounted to the first and second mounting panels, and may be tilted from a first position to a second position by rotating and translating the sub-panel.

The invention will be understood more easily and other objects, characteristics, details and advantages thereof will become more clearly apparent in the course of the following explanatory description, which is given, without in any way implying a limitation, with reference to the attached Figures.

DETAILED DESCRIPTION OF THE INVENTION

Figure 1:
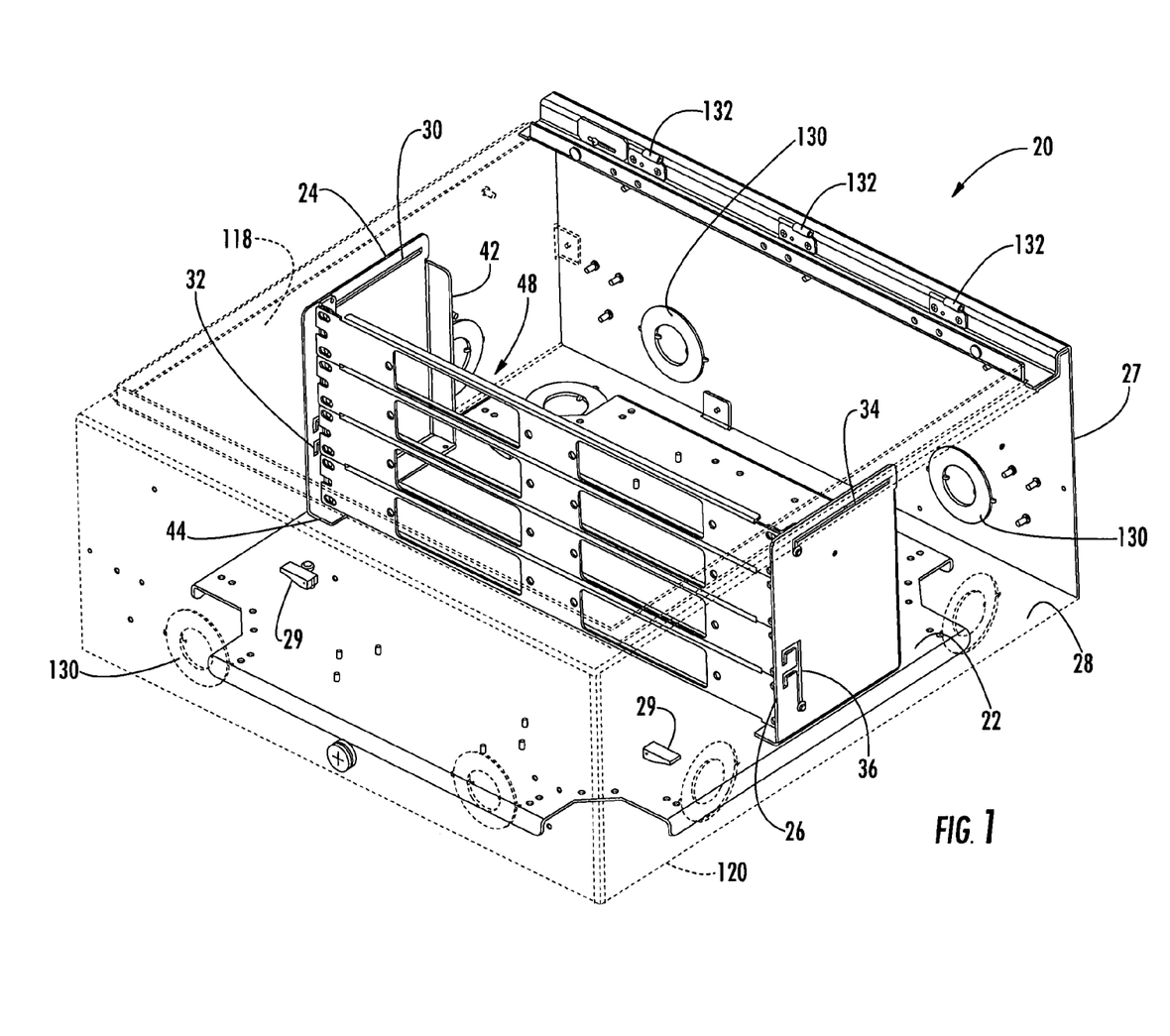
FIG. 1 is a perspective view of an optical fiber distribution apparatus according to an embodiment of the present invention shown with unrelated structure and components depicted by broken lines.

Referring to FIG. 1, the optical fiber distribution apparatus 20 according to an embodiment of the present invention comprises a first base panel 22 and first and second mounting panels 24, 26. First and second mounting panels 24, 26 may be more conveniently referred to as left and right mounting panels, respectively, while noting that the designations left and right are arbitrary. Left and right mounting panels 24, 26 are mounted orthogonal to base panel 22. Base panel 22 and first and second mounting panels 24, 26 may be further mounted within housing 27. One skilled in the art will recognize that distribution apparatus 20 may be mounted in a variety of configurations. For example, apparatus 20 may be mounted on or in a wall, under a floor or in a ceiling. Moreover, first base panel 22 may itself be mounted to a second base panel 28 of housing 27. Preferably, first base panel 22 is removably mounted to second (housing) base panel 28 by a plurality of quick-release latches 29. Alternatively, second (housing) base panel 28 may perform the function of first base panel 22, wherein first base panel 22 is eliminated and side panels 24, 26 are mounted directly to second base panel 28.

Figure 2:
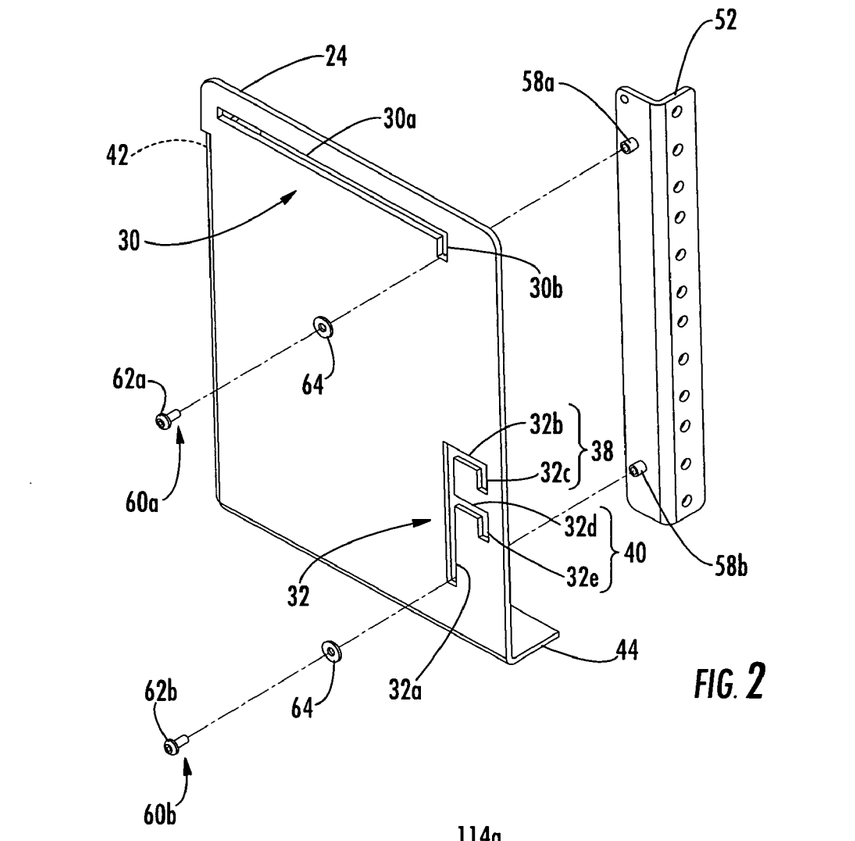
FIG. 2 is an exploded view of a mounting panel according to an embodiment of the present invention shown with a mounting bracket and bearing assemblies.

Each mounting panel 24, 26 comprises a plurality of slots. As illustrated in FIG. 1, mounting panel 24 comprises at least two slots, 30, 32, and mounting panel 26 similarly comprises at least two slots 34, 36. To simplify the following description, reference will be made to left mounting panel 24, with the understanding that right mounting panel 26 is a mirror image of left mounting panel 24, with comparable features. As best shown in FIG. 2, left mounting panel 24 includes two slots 30, 32, each slot being comprised of multiple portions. Slots 30, 32 may be arbitrarily designated as top slot 30 and bottom slot 32. Top slot 30 comprises at least two portions 30a and 30b. Top slot portion 30b is connected to and substantially perpendicular to Top slot portion 30a.

As also illustrated in FIG. 2, bottom slot 32 comprises at least first portion 32a substantially perpendicular to top slot portion 30a, and a second portion 32b connected to and substantially perpendicular to first portion 32a. A third portion 32c is connected to and substantially perpendicular to second portion 32b and substantially parallel to and spaced apart from first portion 32a. Bottom slot 32 may be represented as a single straight portion 32a, substantially perpendicular to slot portion 30a, and to which is connected L-shaped portion 38 comprising second and third portions 32b and 32c. It should be noted that slot 32 may include more than one L-shaped portion. For example, bottom slot 32 may further comprise second L-shaped portion 40 comprising fourth and fifth portions 32d and 32e. Fourth portion 32d is connected to and substantially perpendicular to first portion 32a, and fifth portion 32e is connected to and substantially perpendicular to fourth portion 32d. Additional L-shaped portions may be added to slot 32 as needed.

Mounting panel 24 may have flanges for stiffening the mounting panel and/or to provide mounting surfaces. For example, left mounting panel 24 in FIG. 2 is illustrated as comprising flanges 42 and 44 (seen more clearly in FIG. 1). Mounting panels 24, 26 may be attached to first base panel 22 by any suitable method known in the art. For example, the mounting panels may be attached to base panel 22 by welding, or mounting panels 24, 26 may be attached to first base panel 22 by inserting screws or rivets, such as through flange 44.

Figure 3:
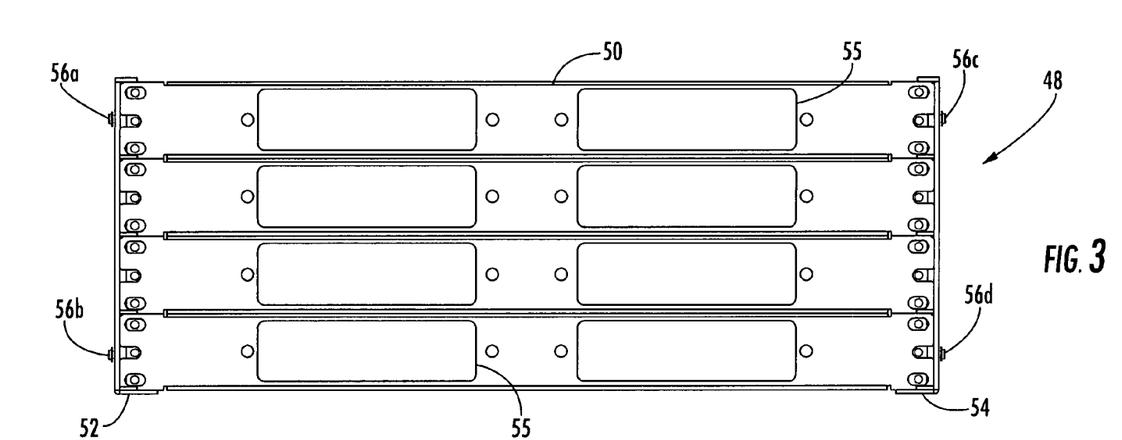
FIG. 3 is a front view of a sub-panel assembly according to an embodiment of the present invention.

Returning to FIG. 1, at least one sub-panel assembly 48 is mounted orthogonally to mounting panels 24, 26. Sub-panel assembly 48, shown in more detail in FIG. 3, comprises sub-panel 50, mounting brackets 52, 54 and bearing assemblies 56a, 56b, 56c, and 56d. Mounting brackets 52, 54 are movably mounted to left and right mounting panels 24, 26, respectively, and may be designated, respectively, left mounting bracket 52 and right mounting bracket 54. Mounting brackets 52, 54 are also mounted to the ends of sub-panel 50 and to their respective mounting panel 24, 26. Sub-panel 50 may further comprise apertures 55 for mounting telecommunications fiber optic components, such as optical fiber connectors or connector adapters.

Bearing assemblies 56a, 56b, 56c and 56d may be arbitrarily referred to as left bearing assemblies 56a, 56b, and right bearing assemblies 56c and 56d. Bearing assemblies 56a, 56b, 56c and 56d provide for mounting the sub-panel assembly 48 to mounting panels 24, 26 and, as better shown in FIG. 2, may be further comprised of individual bearing portions and retaining portions. Preferably, there are two bearing assemblies attached to each mounting bracket. Each mounting bracket may in turn be movably mounted to its respective mounting panel by the two bearing assemblies. FIG. 2 shows left mounting panel 24, left mounting bracket 52, bearing portions 58a and 58b and retaining portions 60a and 60b. Bearing portions 58a, 58b and retaining portions 60a, 60b comprise bearing assemblies 56a and 56b, respectively. Of course, right bearing assemblies 56c and 56d are preferably identical to left bearing assemblies 56a and 56b, with the exception that the right bearing assemblies are oriented opposite the orientation of the left bearing assemblies and mounted on mounting bracket 54.

In a variation of the present embodiment, bearing portions 58a, 58b, 58c and 58d may be rotatably mounted to mounting brackets 52 and 54, such as by retaining portions 60a, 60b and 60c, 60d (not shown) respectively. In still another embodiment, shown in FIG. 4, a bearing assembly according to the embodiment may comprise a bearing portion 59 integral with retaining portion 61. The bearing assembly of FIG. 4 may then be attached to a mounting bracket 52, 54 by conventional means, such as screwing the bearing assembly into a suitable threaded opening or insert provided on the mounting bracket.

Assembly of the present embodiment will be described with respect to left mounting panel 24 and left mounting bracket 52 while noting that right mounting panel 26 and right mounting bracket 54 are assembled and operate in a similar manner. Left mounting bracket 52 is mounted to left mounting panel 24 by inserting bearing portion 58a of left mounting bracket 52 into left mounting panel top slot 30. Second bearing portion 58b is similarly inserted into bottom slot 32 of left mounting panel 24. Retaining portion 60a is thereafter engaged with bearing portion 58a and retaining portion 60b engaged with bearing portion 58b. For example, retaining portion 60a, 60b may be a common screw or bolt wherein the retaining portions are screwed into a threaded bearing portion 58a, 58b, respectively. Preferably, each retaining portion, such as a screw or bolt, has a head 62a, 62b larger than the width of the respective slot 30, 32 with which it is associated to prevent the bearing portions from being subsequently withdrawn from their respective slots. More preferably, washers 64 may be used between the retaining portion heads 62a, 62b and mounting panel 24 to ensure that the respective bearing portion will not unintentionally be withdrawn from the slot 30, 32 with which it is engaged and cooperates. As already noted, right mounting bracket 54 may be mounted to the right side panel in a manner similar to that described above for left mounting bracket 52.

Sub-panel 50 is mounted to left and right mounting brackets 52, 54 by a conventional method, such as by nuts and bolts or by screws. With sub-panel 50 mounted to left and right mounting brackets 52, 54, and left and right mounting brackets 52, 54 subsequently mounted to left and right mounting panels 24, 26 by bearing assemblies 56a, 56b, and 56c, 56d, respectively, sub-panel assembly 48 may be adjusted or moved according to the following description.

Figures 5A, 5B, 5C:
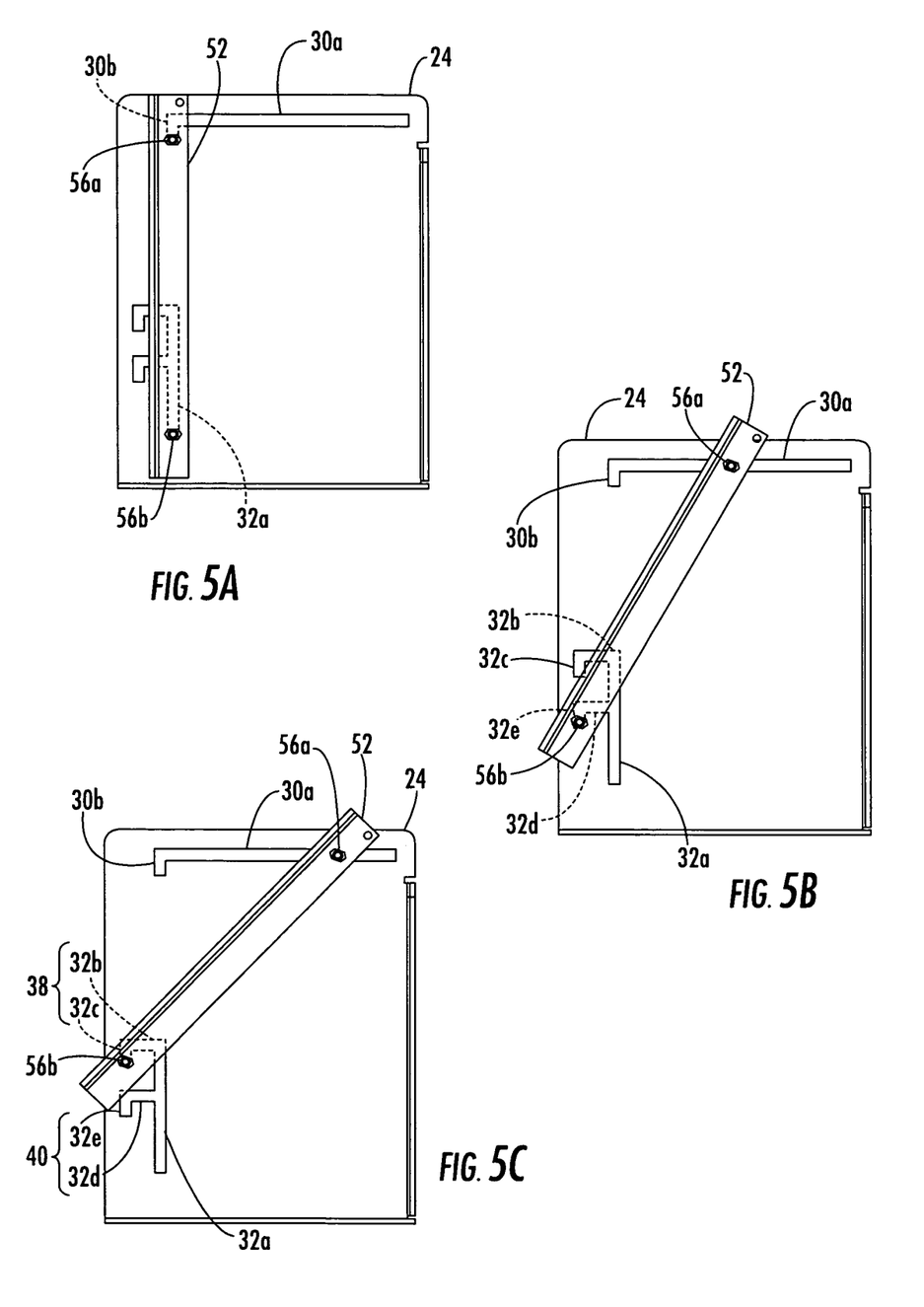
FIG. 5A is a view of the mounting panel of FIG. 2 engaged with a mounting bracket wherein the mounting bracket is shown in a first position.
FIG. 5B is a view of the mounting panel of FIG. 2 engaged with a mounting bracket wherein the mounting bracket is shown in a second position with respect to the view of FIG. 5A.
FIG. 5C is a view of the mounting panel of FIG. 2 engaged with a mounting bracket wherein the mounting bracket is shown in a third position with respect to the view of FIG. 5A.

With sub-panel assembly 48 positioned as shown in FIG. 1 and FIG. 5A wherein the sub-panel assembly 48 is in a substantially orthogonal relationship with base panel 22, bearing assembly 56b is at the bottom of bottom slot portion 32a. Simultaneously, bearing assembly 56a is at the bottom of top slot portion 30b. Since bearing assembly 56a is positioned within the second portion 30b of top slot 30, bearing assembly 56a is restrained to movement only in a direction perpendicular to base panel 22 by portion 30b. Similarly, bearing assembly 56b positioned within bottom slot portion 32a is restrained by bottom slot portion 32a to movement only in a direction perpendicular to base panel 22. Thus, sub-panel assembly 48 is maintained in a substantially orthogonal relationship with base panel 22. As mentioned above, a similar condition exists for the right-side components, but will not be described.

To adjust the position of sub-panel assembly 48 to a second position as indicated in FIG. 5B, sub-panel assembly 48 is first translated in a direction perpendicular to base panel 22 until bearing assembly 56a is clear of top slot second portion 30b. The sub-panel assembly is then moved such that bearing assembly 56a is translated along top slot first portion 30a generally parallel to first base panel 22. Meanwhile, bearing assembly 56b is simultaneously translated along bottom slot first portion 32a perpendicular to base panel 22. Thus, sub-panel assembly 48 is simultaneously translated and rotated. When bearing assembly 56b has reached L-shaped portion 40 (FIG. 2), bearing assembly 56b may be translated horizontal to base panel 22 along slot portion 32d, while bearing assembly 56a likewise is translated horizontal to base panel 22 along slot portion 30a. Bearing assembly 56b is then translated along slot portion 32e in a direction perpendicular to base panel 22 until bearing assembly 56b has reached the end of slot portion 32e. Bearing assembly 56b is restrained from movement horizontal to base panel 22 by bottom slot portion 32e, and bearing assembly 56a is restrained from movement perpendicular to base panel 22 by top slot portion 30a. Thus, sub-panel assembly 48 is maintained in a predetermined angular relationship with base panel 22.

Sub-panel assembly 48 may be further adjusted to a third predetermined angular relationship with respect to base panel 22, as depicted in FIG. 5C, by moving bearing assembly 56b back along bottom slot portions 32e and 32d in reverse of the operation previously described until the bearing portion has reached bottom slot portion 32a. Bearing assembly 56a is free to travel within slot portion 30a. Bearing assembly 56b may then be translated along bottom slot portion 32a perpendicular to base panel 22 until bearing assembly 56b has reached bottom slot portion 32b. Similar to the description above, bearing assembly 56b is then translated first along bottom slot portion 32b parallel to base panel 22 and then along bottom slot portion 32c perpendicular to first base panel 22 while bearing assembly 56a is translated along top slot portion 30a, causing sub-panel assembly 48 to simultaneously translate and rotate into a second predetermined angular relationship with respect to base panel 22. It will be recognized by the skilled artisan that the number of predetermined angular positions into which sub-panel assembly 48, and therefore sub-panel 50, may be placed is dependent upon the number of L-shaped paths, e.g. 38 and 40, which are formed into bottom slot 32.

Figures 4, 7:
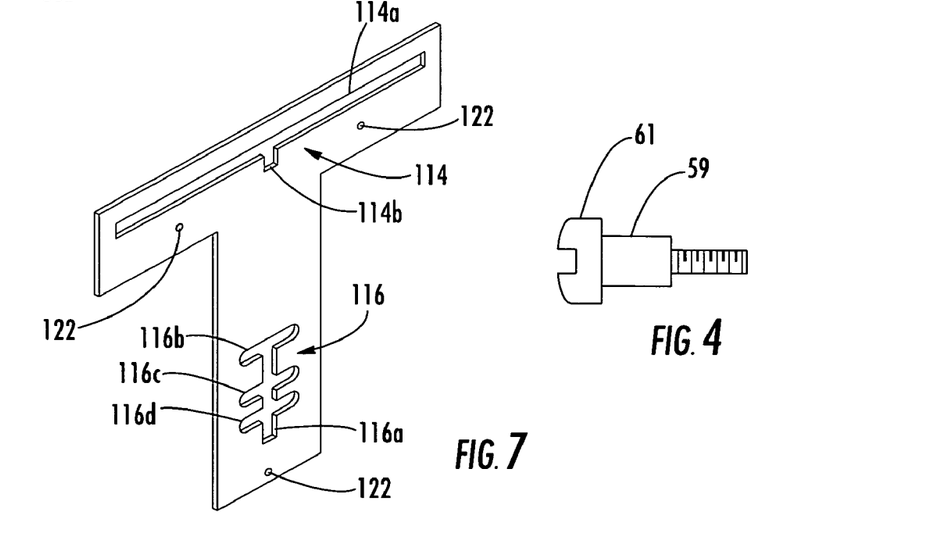
FIG. 4 is a side view of an embodiment of a bearing assembly according to the present invention.
FIG. 7 is a perspective view of a mounting panel according to another embodiment of the present invention.
Figure 6:
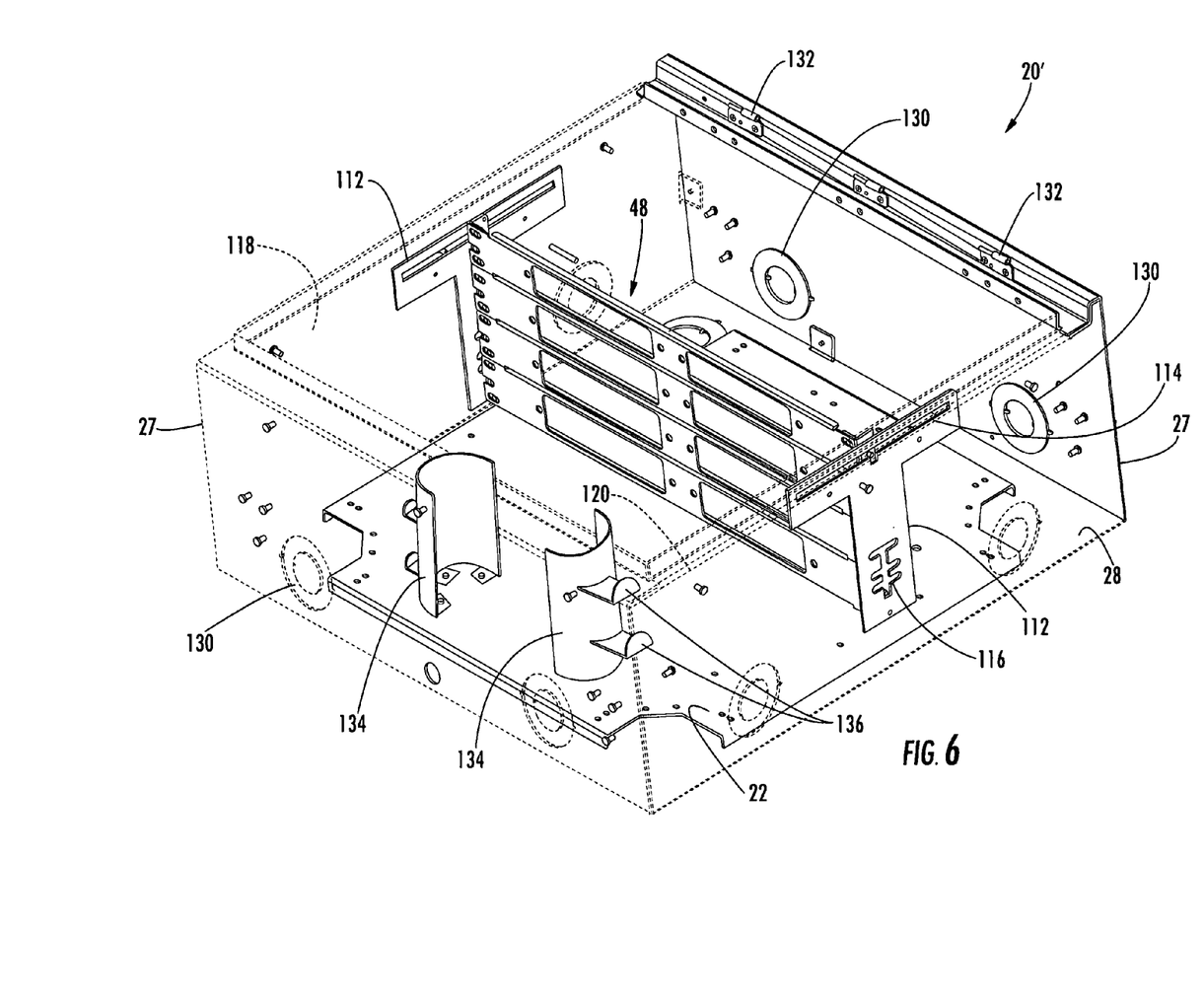
FIG. 6 is a perspective view of another optical fiber distribution apparatus according to another embodiment of the present invention shown with unrelated structure and components depicted by broken lines.

FIG. 6 depicts another embodiment of an optical fiber distribution apparatus according to the present invention, generally designated by the reference numeral 20'. In the present embodiment, both left and right mounting panels are preferably identical, and designated by reference numeral 112. Both left and right mounting panels 112 include at least top and bottom slots 114, 116, respectively. The designation "top", "bottom", "left" and "right" are arbitrary, and depend upon the orientation of the apparatus. As used herein, the designations are illustrative, and provided with respect to the orientation shown. As before, the embodiment will be described with reference to only one side, arbitrarily chosen as the "left" side. As shown in FIG. 7, top slot 114 comprises a first slot portion 114a substantially parallel to base panel 22, and a second portion 114b connected to and substantially perpendicular to first portion 114a. Second slot portion 114b is preferably connected to first slot portion 114a at a medial position thereof.

Bottom slot 116 comprises first slot portion 116a generally perpendicular to top slot portion 114a, and at least one additional slot portion, such as the illustrated second slot portion 116b connected to and substantially perpendicular to first portion 116a. Preferably, slot portion 116a connects with slot portion 116b at a medial position thereof. Preferably, bottom slot 116 comprises a plurality of slot portions which connect perpendicularly to slot portion 116a. In the embodiment shown in FIGS. 6 and 7, bottom slot 116 comprises three slot portions crossing slot portion 116a; namely 116b, 116c and 116d.

Left and right mounting panels 112 may be mounted to left and right housing side wall panels 118, 120, respectively, such as with screws through mounting holes 122 and standoffs (not shown). However, other methods of attaching the mounting panels 112 may be used as are known in the art, such as rivets or quick-release fasteners. Left and right mounting panels 112 are preferably fixedly attached to housing side wall panels 118, 120, but spaced apart therefrom. Alternatively, housing side wall panels 118, 120 may perform the function of left and right mounting panels 112, wherein slots 114 and 116 would be formed directly in housing side wall panels 118, 120. Moreover, mounting panels 112 may be attached directly to base panel 22 rather than to housing side wall panels 118, 120. In the instance wherein apparatus 20' does not comprise a first base panel 22, left and right mounting panels 112 may be attached directly to second housing panel 28.

Figure 8:
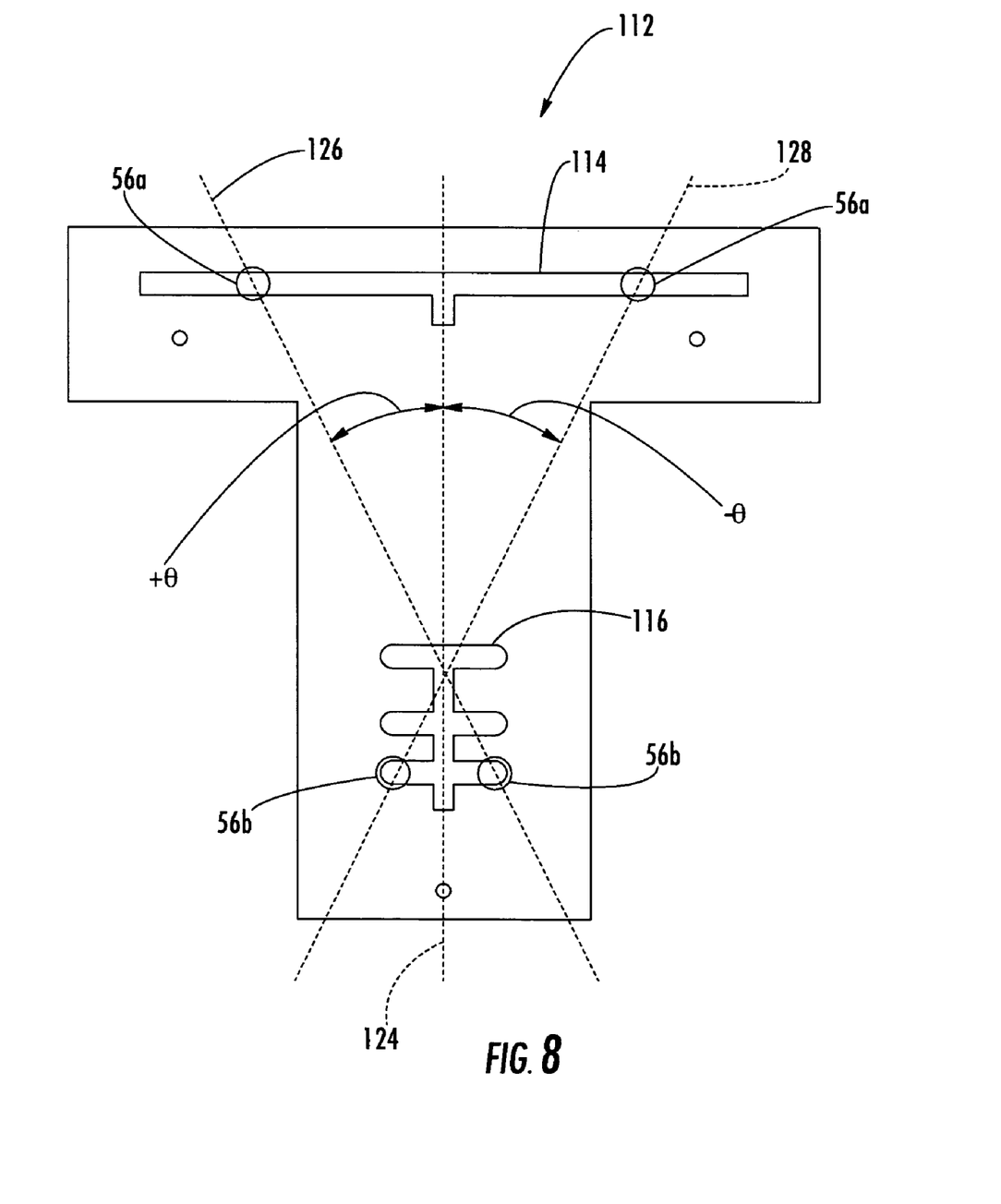
FIG. 8 is a front view of the mounting panel of FIG. 9 showing clockwise and counter-clockwise angular positions of the sub-panel assembly.

In a manner similar to that described above, sub-panel assembly 48 may be placed into pre-defined positions relative to base panel 22 by simultaneously translating and rotating sub-panel assembly 48 such that bearing assemblies 56a and 56b translate along top and bottom slots 114, 116. Advantageously, the cruciform shapes depicted in FIG. 8 wherein the plurality of slot portions 116b, 116c and 116d connect with first slot portion 116a allows sub-panel assembly 48 to be moved into a plurality of predetermined angular positions with respect to base panel 22. FIG. 8 shows one such mounting panel 112. Broken line 124 represents a side edge of sub-panel assembly 48 in a position substantially perpendicular to base panel 22, whereas broken lines 126, 128 depict the edge of sub-panel assembly 48 in two different positions. Arbitrarily, broken line 126 represents an angular position of +θ degrees (wherein the "+" sign indicates a counter-clockwise rotation) relative to position 124 and broken line 128 represents an angular position of −φ degrees (wherein the "−" sign indicates a clockwise rotation) relative to position 124. The magnitude of angle θ may or may not be equal to the magnitude of angle φ; preferably, the magnitude of angle θ equals the magnitude of angle φ. The flexibility to travel through both positive and negative (i.e. counter-clockwise and clockwise) angular positions with respect to reference position 124 advantageously may provide greater accessibility for users of the apparatus.

Preferably, apparatus 20 and apparatus 20' include at least one knockout 130. Preferably, apparatus 20 and apparatus 20' include a plurality of knockouts 130. The at least one knockout 130 may be removed in order to route an optical fiber or optical fiber cable into the apparatus. Preferably, apparatus 20 and apparatus 20' are fitted with at least one hinge 132 on housing 27 for attaching a cover panel (not shown). Hinge 132 may be a single hinge that extends along substantially the entire width of the apparatus between side walls 118, 120, or the apparatus may comprise a plurality of hinges as shown in FIGS. 1 and 6. Apparatus 20 and 20' may also include a plurality of curved walls 134, depicted in FIG. 6, for storing slack, i.e. excess, optical fiber. Preferably, curved walls 134 include organizing tangs 136 for organizing any excess optical fiber stored thereon.

Figure 9:
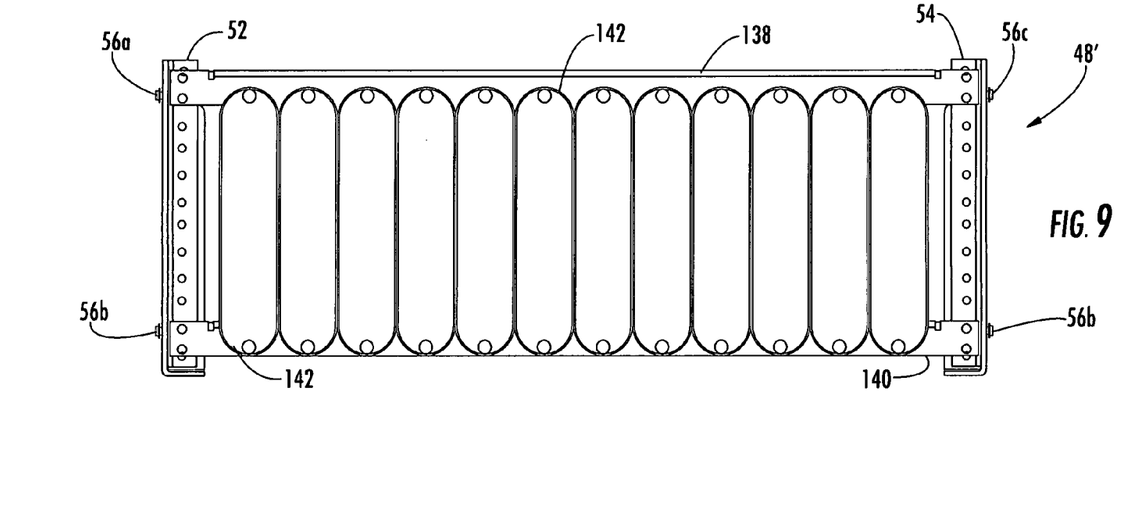
FIG. 9 is a front view of a sub-panel assembly according to another embodiment of the present invention comprising mounting rails.

In still another embodiment of the invention shown in FIG. 9, sub-panel assembly 48' is similar to sub-panel assembly 48 with the exception that sub-panel 50 may be replaced with first ("top") mounting rail 138 and second ("bottom") mounting rail 140. Mounting rails 138 and 140 are attached to mounting brackets 52, 54. Cover plates 142 may be used to cover unused fiber optic component mounting locations between top and bottom mounting rails until a fiber optic component is to be connected to the mounting rails. Cover plates 142 may be mounted to the mounting rails in a conventional manner, such as by screws or quick-release fasteners. With the exception of substituting mounting rails 138, 140 for sub-panel 50, sub-panel assembly 48' operates in the same manner as sub-panel assembly 48.

While various exemplary embodiments of the present invention are described above, it is understood that the various features described in connection with the embodiments of the present invention can be used singly or in combination thereof. Therefore, this invention is not to be limited to the exemplary embodiments depicted herein.

It will be apparent to those skilled in the art that various other modifications and variations can be made to the present invention without departing from the spirit and scope of the invention. Thus, it is intended that the present invention cover any and all modifications and variations of the invention that fall within the scope of the appended claims and their equivalents.

What is claimed is:

1. An optical fiber distribution apparatus comprising:
   a base panel;
   first and second mounting panels, the first and second mounting panels spaced apart and mounted to the base panel;
   a sub-panel assembly for mounting a plurality of fiber optic components, the sub-panel assembly being movably mounted between the mounting panels; and
   wherein the sub-panel assembly may be moved from a first position to a second position by translating and rotating the sub-panel assembly relative to the mounting panels.

2. An optical fiber distribution apparatus according to claim 1 wherein the at least one sub-panel assembly may be tilted from the first position to the second position by simultaneously translating and rotating the sub-panel assembly.

3. An optical fiber distribution apparatus according to claim 1 wherein each mounting panel comprises at least a first slot and a second slot.

4. An optical fiber distribution apparatus according to claim 3 wherein each of the first and second slots includes at least a first slot portion and a second slot portion, the second slot portion being connected to and substantially perpendicular to the first slot portion.

5. An optical fiber distribution apparatus according to claim 4 wherein the sub-panel assembly comprises a plurality of bearing assemblies for slidably engaging with the first and second slots.

6. An optical fiber distribution apparatus according to claim 5 wherein each bearing assembly comprises a bearing portion and a retaining portion.

7. An optical fiber distribution apparatus according to claim 5 wherein each bearing portion is retained within a respective one of the first and second slots by the retaining portion.

8. The optical fiber distribution apparatus to claim 1 wherein the sub-panel assembly comprises at least one opening for receiving a fiber optic component.

9. The optical fiber distribution apparatus according to claim 8 wherein the fiber optic component is an optical fiber connector.

10. The optical fiber distribution apparatus according to claim 8 wherein the fiber optic component is an adapter for receiving an optical fiber connector.

11. The optical fiber distribution apparatus according to claim 1 further comprising at least one guide wall mounted to the base panel for storing excess optical fiber, wherein at least a portion of the guide wall is curved.

12. The optical fiber distribution apparatus according to claim 6 wherein the bearing portion engages with the second slot portion to fix the sub-panel assembly in a predetermined angular relationship with respect to the base panel.

13. The optical fiber distribution apparatus according to claim 1 wherein the mounting panels are mounted generally orthogonal to the base panel.

14. The optical fiber distribution apparatus according to claim 1 wherein the first and second mounting panels are attached to a first side wall and a second side wall, respectively, of a housing.

15. The optical fiber distribution apparatus according to claim 1 wherein the sub-panel assembly comprises top and bottom mounting rails.

16. The optical fiber distribution apparatus according to claim 14 wherein the base panel is removably attached to the housing.

17. An optical fiber distribution apparatus comprising:
   a base panel and first and second mounting panels wherein the first mounting panel is in an opposing relationship and substantially parallel with the second mounting panel;
   a sub-panel assembly for mounting at least one fiber optic component, the sub-panel assembly being movably mounted between the first and second mounting panels; and
   wherein the sub-panel assembly may be moved from a first position to a second position by simultaneously translating and rotating the sub-panel assembly relative to the first and second mounting panels.

18. The optical fiber distribution apparatus according to claim 17 wherein the sub-panel assembly may be rotated in either a clockwise or a counter-clockwise direction.

19. The optical fiber distribution apparatus according to claim 17 wherein the first and second mounting panels each comprise at least a first slot and second slot.

20. The optical fiber distribution apparatus according to claim 19 wherein the sub-panel assembly comprises a plurality of bearing assemblies for slidably engaging with the first and second slots.

21. An optical fiber distribution apparatus comprising:
   a first mounting panel;
   a second mounting panel disposed in a spaced apart and substantially parallel relationship with the first mounting panel;
   a sub-panel assembly comprising a sub-panel for mounting at least one fiber optic component, the sub-panel assembly being movably mounted between the first and second mounting panels; and
   wherein the sub-panel assembly may be tilted from a first position to a second position by translating and rotating the sub-panel relative to the first and second mounting panels.

22. The optical fiber distribution apparatus according to claim 21 wherein the sub-panel may be rotated in either a clockwise or a counter-clockwise direction.

23. The optical fiber distribution apparatus according to claim 21 wherein each of the first and second mounting panels comprises at least a first and second slot.

24. The optical fiber distribution apparatus according to claim 23 wherein the sub-panel assembly comprises a plurality of bearing assemblies for engaging with the first and second slots.

* * * * *